United States Patent
Mezey

[15] 3,691,434
[45] Sept. 12, 1972

[54] HIGH TEMPERATURE VARIABLE CAPACITOR
[72] Inventor: Frank G. J. Mezey, Centerport, N.Y. 11721
[73] Assignee: American Technical Ceramics, Hunington, Station, N.Y.
[22] Filed: June 28, 1971
[21] Appl. No.: 157,099

[52] U.S. Cl. ..............................317/243, 317/249 T
[51] Int. Cl. ................................................H01g 1/08
[58] Field of Search........317/243, 245, 249 T, 249 R

[56] References Cited

UNITED STATES PATENTS 3,155,887   11/1964   Barnes ..................317/249 T
3,426,256   2/1969   Vinz ..........................317/245

Primary Examiner—E. A. Goldberg
Attorney—Edward H. Loveman

[57] ABSTRACT

A variable capacitor has an electrically conductive piston secured to one end of a metal bellows in a dielectric cylinder which carries a metal sleeve and comprises a first electrical terminal. The second end of the bellows is fixed to a second electrical terminal which closes one end of the cylinder. A liquid dielectric fills the chamber inside the cylinder and flows through a groove in the piston when the piston moves axially contracting or expanding the bellows. A flexible diaphragm closes the second end of the chamber.

9 Claims, 3 Drawing Figures

PATENTED SEP 12 1972 3,691,434

INVENTOR.
FRANK G. J. MEZEY
BY
Edward H. Loveman
ATTORNEY

HIGH TEMPERATURE VARIABLE CAPACITOR

This invention relates to a variable capacitor assembly with telescopically adjustable direct travel mechanism, and more particularly concerns such a variable capacitor having a liquid dielectric encased between a movable piston electrode and a dielectric sleeve.

Variable Capacitors are generally well-known structures wherein a conductive piston moves within a dielectric cylinder having an electrode band thereon. The dielectric cylinder is carried by a support which may be one electrical terminal of the capacitor. A piston is axially movable in the dielectric cylinder for varying the capacitance of the capacitor.

Prior variable capacitors of the type described are not well adapted for operation at high power resulting in high temperatures because they lack facilities for conducting heat away from the electrodes. Another difficulty is caused by lubricant used to facilitate piston movement. This leaks into the space between piston and dielectric cylinder to change dielectric characteristics. Moreover Corona discharge frequently takes place between spaced sharp points in the capacitor and this causes capacitor breakdown.

The present invention is directed at avoiding the above and other difficulties and disadvantages of prior variable capacitors with direct travel mechanisms.

According to the invention, the capacitor is comprised of a stud which serves as one electrical terminal of the capacitor. This terminal supports a sleeve provided with heat radiating ridges and grooves. Inserted and secured in the sleeve is a heat resistant dielectric cylinder coated with a metal film to serve as an electrode. The cylinder is closed at one end by a diaphragm and at the other end by a bushing which serves as the second electrical terminal. Movably disposed inside the dielectric cylinder is a rotable shaft threaded into a hollow piston. Secured between one end of the piston and the bushing is a metallic compressible and expansible bellows enclosing the shaft. A liquid dielectric surrounds the bellows. The capacitor assembly is rugged in construction and reliable in operation.

Accordingly, it is a principal object of the present invention to provide a variable capacitor for operating at elevated temperatures and radio frequency power ratings.

Another object of the present invention is to provide a variable capacitor with improved sealing for the adjustable piston without an additional enclosure.

A further object of the present invention is to provide a variable capacitor with a bellows for forming a chamber containing a dielectric fluid for dissipating the heat generated within the capacitor.

These and other objects and many of the attendant advantages of this invention will be readily appreciated as the same becomes better understood by reference to the following detailed description when considered in connection with the accompanying drawings in which.

Figure 1:
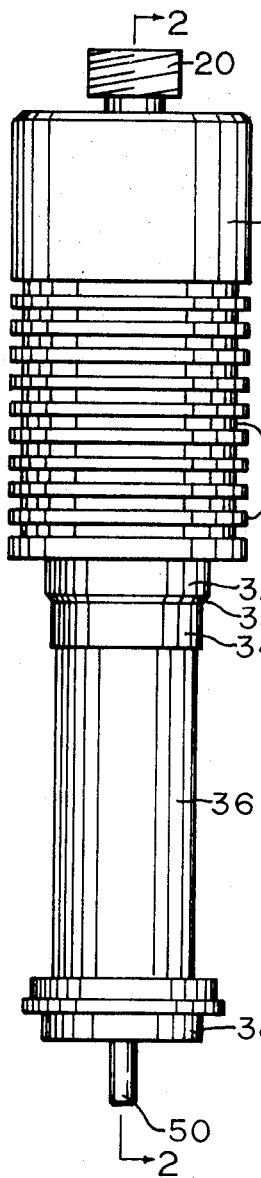
FIG. 1 is a side view of a capacitor assembly embodying the invention.
Figure 2:
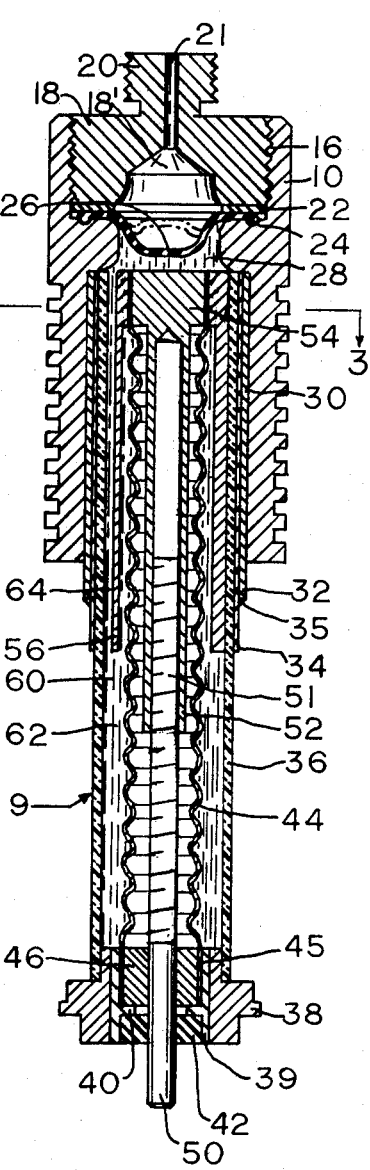
FIG. 2 is a longitudinal central sectional view taken along line 2—2 of FIG. 1.
Figure 3:
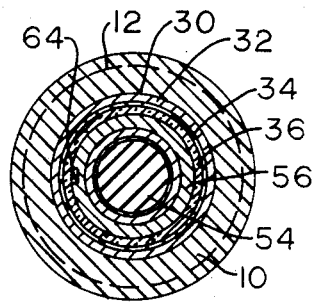
FIG. 3 is a cross-sectional view taken along line 3—3 of FIG. 2.

Referring now to the drawings wherein like reference characters designate like or corresponding parts throughout, there is illustrated in FIGS. 1, 2, and 3 a variable capacitor assembly generally designated as numeral 9 including a cylindrical metal sleeve 10 formed with a multiplicity of alternating circumferential grooves 12 and ridges 14 for radiating heat away from the assembly 9. Threaded into a threaded bore 16 at one end of the sleeve 10 is an externally threaded metal stud 18 having a head 20 formed with a central opening 21. This stud serves as one electrical terminal of the variable capacitor assembly 9. The stud 18 bears against a metal ring 22 which in turn bears against an annular flange 24 of a flexible diaphragm 26 which closes one end of a chamber 28 inside the assembly 9. Secured inside a cylindrical bore 30 in the sleeve 10 is a rigid metal sleeve 32 which serves as a liner. Sleeve 32 surrounds a metal film or layer 34 deposited on and bonded to a dielectric cylinder 36 which may be manufactured of glass, ceramic or quartz and is well adapted to stand high temperature operating conditions. The layer 34 constitutes the stator electrode of the capacitor assembly and the sleeve 32 may be bonded thereto for example by welding as shown at 35.

The cylinder 36 extends axially beyond the sleeve 32 and the layer 34 and carries at its outer end a metal bushing 38 which serves as another electrical terminal of the capacitor assembly. A metal liner 39 is fitted in the bushing 38 and has an inner annular flange 40 which serves as an abutment for an end thrust bearing 42. Also fitted in the liner 39 is one end of an axially compressible and expansible metal bellows 44. A cylindrical end 45 of the bellows 44 is bonded to a ring 46 which if force fitted into the liner 39. Extending axially of the bellows 44 is an axially movable piston rod or shaft 50 used to adjust capacitance of the assembly. An inner end 51 of the shaft 50 is externally threaded and screwed into a piston 52 having a head 54 near the diaphragm 26 in the chamber 28 and a metal sleeve 56. The second end of the bellows is secured to the piston 52 at the head 54. A cylindrical chamber 60 is defined between the outer side of the bellows 44 and the inner side of the cylinder 36. This chamber is filled with a liquid dielectric 62 composed of a suitable silicone. An axially extending radial groove 64 is formed in the outer side of the sleeve 56 to provide communication between the chambers 60 and 28. Thus liquid 62 fills both of the chambers 28 and 60 and flows therebetween via a groove 64, as clearly illustrated in FIG. 3.

In operation, the shaft 50 of the variable capacitor assembly 9 is rotated clockwise as viewed in FIG. 3 to compress the bellows 34 and move the electrode sleeve 56 axially away from the stationery electrode layer 34 to decrease the electrical capacitance of the assembly 9. Counterclockwise rotation of the shaft 50 (as viewed in FIG. 3) expands the bellows 44 to insert more of the sleeve electrode 56 axially into the electrode layer 34 to increase capacitance. As the bellows 44 contracts axially the liquid dielectric 62 flows through the groove 64 from the chamber 60 to the chamber 28 and as the bellows 44 expands axially the liquid 62 flows from the chamber 28 to the chamber 60. By this arrangement the dielectric characteristic of the capacitor assembly remains substantially the same, while capacitance variation is effected by the degree of insertion of one electrode into the other. Since the sleeve 56 is very close to the dielectric cylinder 36 maximum possible capacitance is obtained when the sleeve 56 is fully inserted axially in the layer 34 and the sleeve 32. The diaphragm 26 responds to variation of pressure in the fluid 62 and expands or contracts to adjust the volumn of the chamber 28 accordingly. The diaphragm 26 can expand into the tapered chamber 18' defined inside of stud 18 and with which an air pressure release hole 21 communicates. The structure described is such that the piston may move axially but is prevented from rotation by the bellows 44. Corona discharge is effectively prevented between the end of the layer 34 in the bore 30 and the electrode sleeve 56 by the liquid dielectric 62 filling the chamber 28. The bellows 44 may be made of nickel coated with a plating of silver or copper to provide high electrical conductance and low inductance. It will be noted that there is a direct electrical path between the electrical terminal bushing 38 and the electrode sleeve 56 via the bellows 44 and the ring liner 39. Heat developed in the liquid dielectric 62 during operation of the capacitor assembly is effectively radiated by the sleeve 10. Thus, the assembly can be operated at high temperatures and is rugged in construction and reliable in operation. It may be manufactured in miniature sizes to provide precision adjustable capacitance in appropriate electrical circuits. The assembly can be used in satellite and space vehicles, ballistic missiles and electronic equipment of numerous types.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A variable capacitor assembly comprising
   a dielectric cylinder having a first end cap and a second end cap,
   an electrically conductive layer bonded along a portion of said cylinder and constituting a first electrode,
   a piston means movable axially within said cylinder and having an electrically conductive cylindrical sleeve, said piston means constituting a second electrode,
   a shaft means having one end connected to said second electrode,
   a cylindrically axially expanding and contracting bellows means surrounding said shaft means and having one end secured to said second electrode whereby axial movement of said piston and said bellows means inside said cylinder by motion of said shaft means varies the electrical capacitance between said first and said second electrodes, and
   wherein said first end cap has an inner bore defining a first chamber and said bellows means is spaced radially from said dielectric cylinder defining a second chamber therebetween and a liquid dielectric filling both chambers.

2. A variable capacitor assembly as defined in claim 1 wherein said first end cap includes a thermal conductive sleeve surrounding at least a part of said dielectric cylinder for conducting and radiating heat away from said cylinder.

3. A variable capacitor assembly as defined in claim 1, wherein said electrically conductive cylindrical sleeve of said piston means extends axially into said second chamber.

4. A variable capacitor assembly as defined in claim 1, further comprising a flexible diaphragm in said inner bore in said first end cap thereby constituting an end wall of said first chamber and retaining said liquid dielectric therein.

5. A variable capacitor assembly as defined in claim 1 wherein said electrically conductive cylindrical sleeve is formed with an outer radial axially extending groove providing communication between said first and second chambers so that said liquid dielectric flows freely between said chambers when said piston means is moved axially in said dielectric cylinder.

6. A variable capacitor assembly as defined in claim 4 further comprising an electrically conductive stud inserted in one end of said first end cap to retain said diaphragm in said bore and to serve as one electrical terminal of said assembly; and an electrically conductive further sleeve surrounding said electrically conductive layer and bonded thereto for mechanically protecting the same and for providing a direct electrical path between said layer and said first end cap.

7. A variable capacitor assembly as defined in claim 6, further comprising an electrically conductive bushing inserted in the end of said dielectric sleeve remote from said flexible diaphragm for closing said second chamber and constituting a second electrical terminal of said assembly, said bellows having one end secured in said bushing to provide a direct electrical path between said electrically conductive cylindrical sleeve and said bushing.

8. A variable capacitor assembly as defined in claim 7, further comprising bearing means inserted in said bushing for supporting said shaft means thereby facilitating movement thereof inside said bellows.

9. A variable capacitor assembly as defined in claim 1 wherein one end of said shaft means has external threads thereon and said piston means has corresponding internal threads therein and is thereby connected to said shaft means whereby rotation of said shaft will cause said piston to move axially within said dielectric cylinder.

* * * * *